United States Patent
Stablo

(10) Patent No.: US 11,518,297 B2
(45) Date of Patent: Dec. 6, 2022

(54) LIGHT ELEMENT FOR BODYWORK COMPONENT MADE OF INJECTION-MOLDED POLYCARBONATE

(71) Applicant: COMPAGNIE PLASTIC OMNIUM, Lyons (FR)

(72) Inventor: Frédéric Stablo, Sainte-Julie (FR)

(73) Assignee: Compagnie Plastic Omnium, Lyons (FR)

(*) Notice: Subject to any disclaimer, the term of this patent is extended or adjusted under 35 U.S.C. 154(b) by 0 days.

(21) Appl. No.: 17/415,457

(22) PCT Filed: Dec. 18, 2019

(86) PCT No.: PCT/EP2019/085978
§ 371 (c)(1),
(2) Date: Jun. 17, 2021

(87) PCT Pub. No.: WO2020/127502
PCT Pub. Date: Jun. 25, 2020

(65) Prior Publication Data
US 2022/0072993 A1  Mar. 10, 2022

(30) Foreign Application Priority Data
Dec. 19, 2018 (FR) .................... 1873441

(51) Int. Cl.
*B60Q 1/26* (2006.01)
*B60R 19/52* (2006.01)

(52) U.S. Cl.
CPC .......... *B60Q 1/2619* (2013.01); *B60R 19/52* (2013.01); *B60R 2019/525* (2013.01)

(58) Field of Classification Search
CPC .................................. B60Q 1/2619
See application file for complete search history.

(56) References Cited

U.S. PATENT DOCUMENTS

| | | | |
|---|---|---|---|
| 2013/0293104 A1 | 11/2013 | Wu | |
| 2015/0138807 A1 | 5/2015 | Salter et al. | |
| 2017/0197542 A1* | 7/2017 | Belcher | G02B 6/005 |

FOREIGN PATENT DOCUMENTS

| | | |
|---|---|---|
| CN | 202764900 U | 3/2013 |
| DE | 202012008792 | 9/2012 |

(Continued)

OTHER PUBLICATIONS

International Search Report and Written Opinion of International Searching Authority for PCT/EP2019/085978, ISA/NL, Rijswijk, Netherlands, dated Mar. 3, 2020.

*Primary Examiner* — Joseph L Williams
(74) *Attorney, Agent, or Firm* — M&B IP Analysts, LLC

(57) ABSTRACT

A light element for a bodywork component is provided. The light element includes at least one light source and a light guide, where the light guide forms a profile of an open cross-section, comprising:
a first element made of injection-molded transparent polycarbonate, defining, along substantially the entire length of the profile, a zone (ZT) that is transparent to the light emitted by the light source;
at least one second element made of injection-molded black polycarbonate, defining, along substantially the entire length of the profile, a zone (ZO) that is opaque to the light emitted by the light source;
the light source emitting light from inside the profile toward the transparent and opaque zones.

16 Claims, 4 Drawing Sheets

(56) References Cited

FOREIGN PATENT DOCUMENTS

| | | |
|---|---:|---|
| EP | 3190006 A1 | 7/2017 |
| FR | 3081388 A1 | 11/2019 |
| JP | 2013037963 A | 2/2013 |
| WO | 03066374 A2 | 8/2003 |
| WO | 2017059431 A1 | 4/2017 |
| WO | 2018073678 A1 | 4/2018 |

* cited by examiner

[Fig. 1]
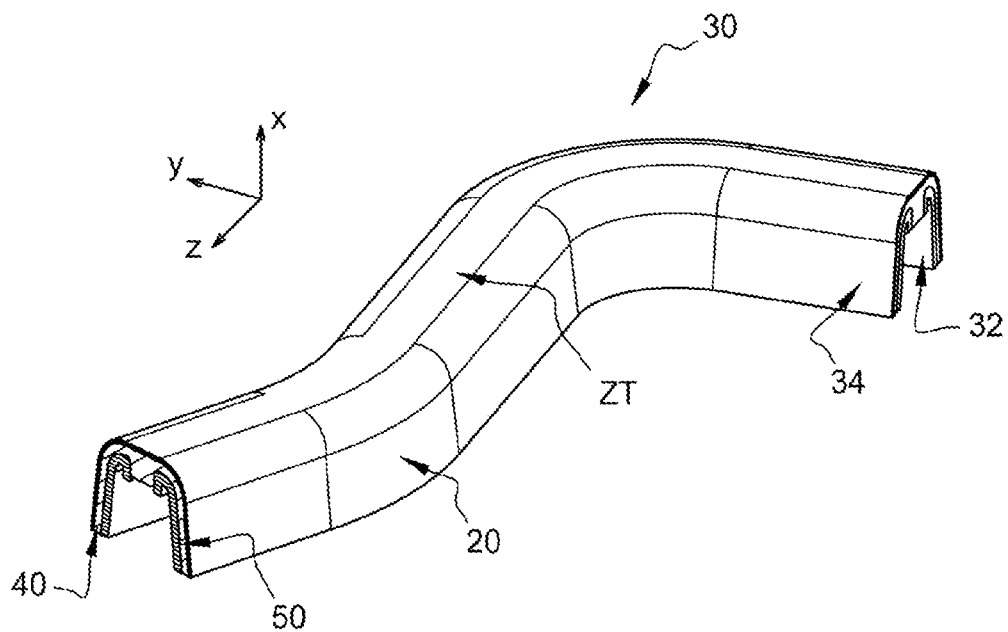
[Fig. 2]
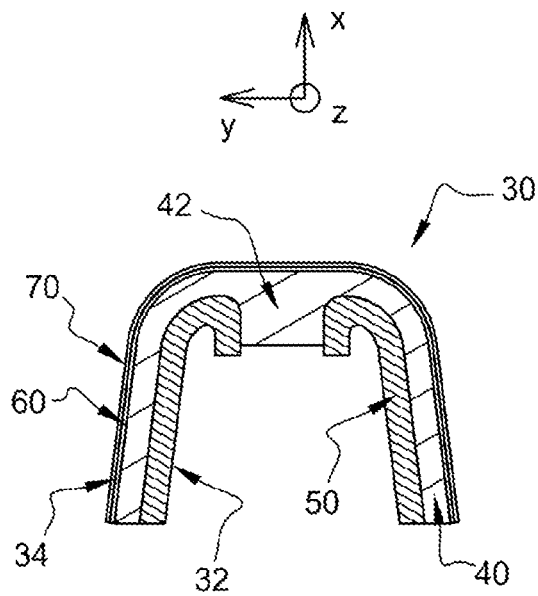

[Fig. 3]
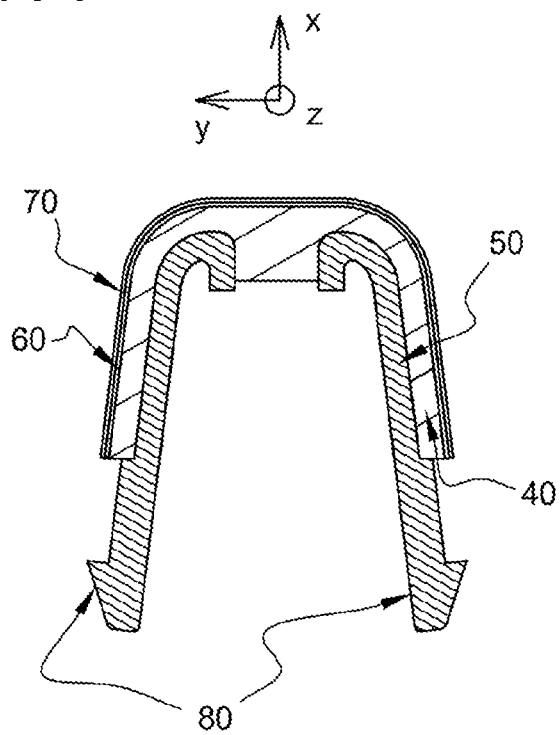
[Fig. 4]
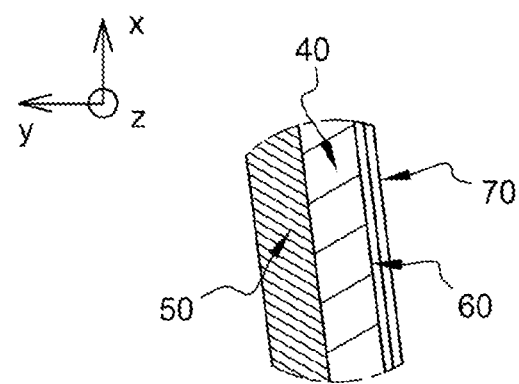

[Fig. 5]
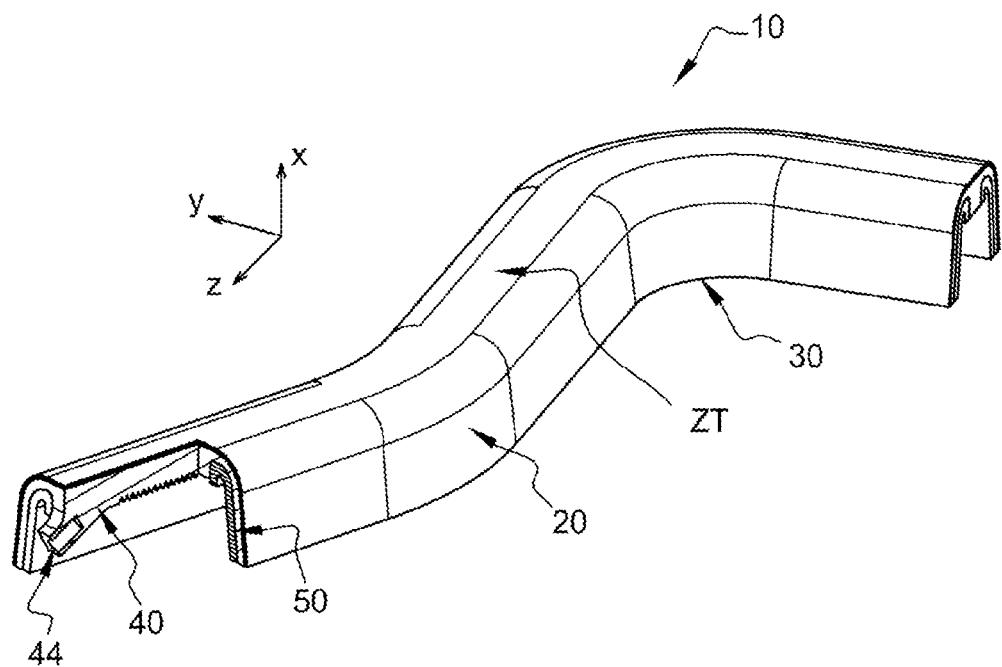
[Fig. 6]
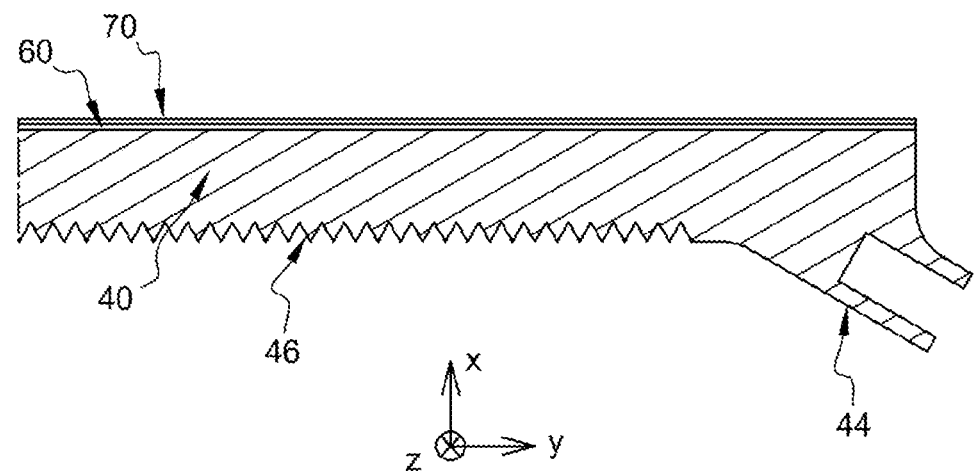

[Fig. 7]
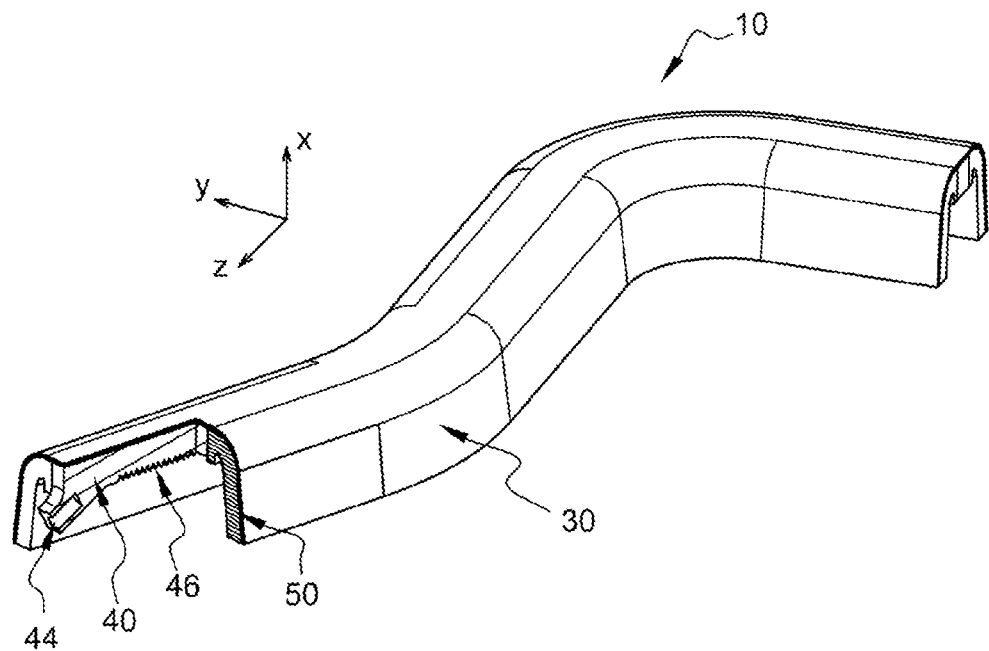
[Fig. 8]
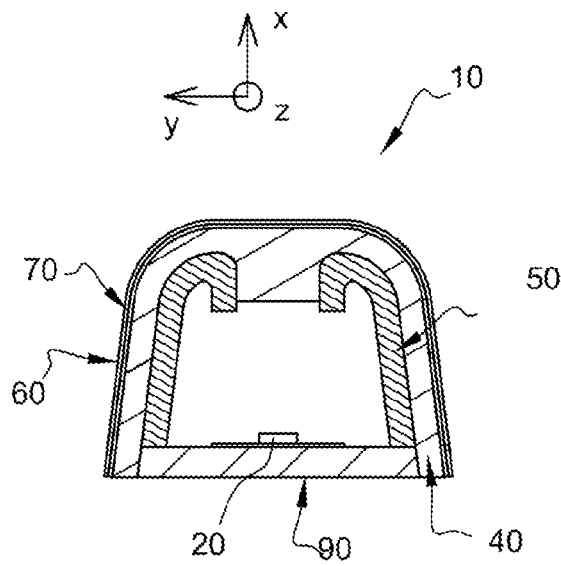

LIGHT ELEMENT FOR BODYWORK COMPONENT MADE OF INJECTION-MOLDED POLYCARBONATE

The present disclosure relates to the field of bodywork components for motor vehicles, and more specifically with bodywork components comprising a light element visible from outside the vehicle, for example forming a light signature.

The term "light element" is understood to mean a device capable of diffusing light toward the outside of the vehicle. Such light elements can constitute esthetic components, arranged for example on the front face, or on the doors of a vehicle in order to produce a light signature.

It is known to produce bodywork components comprising a light element, for example to form a light signature. In such cases, the light source is protected by a portion of the component made from transparent plastic. The light source can for example be placed in a recess formed in the external face of the bodywork component and behind the transparent portion or else sandwiched between two parts of the transparent portion. The transparent portion can then be mounted on a bodywork component, which is for example opaque. An opaque bodywork component is thus obtained comprising a transparent portion capable of letting through the light emitted by the light source protected by the transparent portion.

However, bodywork components as described above have certain drawbacks.

Indeed, the transparent portion is made of a relatively rigid material. Therefore, the latter may prove to be brittle, which leads to limiting its dimensions in order to reduce the risk of breakage. It is therefore difficult to obtain a transparent portion having particular dimensions, for example of a considerable length and a reduced width. This difficulty in handling a transparent portion having dimensions like those mentioned above, can very particularly pose a problem in the context of producing a light signature, which is generally long and thin. The manufacturing process can be unprofitable and the assembly process more complex (manufacturing a portion of the component in isolation, portion attached to the main body of said component).

To overcome this problem, light elements can be used since they are made from flexible material (FR 1854470). However, with this type of element, it is difficult to obtain uniform illumination when the length is considerable.

In addition, this type of device has many drawbacks. In fact, a transparent or translucent element makes it possible to obtain good lighting, but the light source is then visible when it is off, which is not always desirable from an esthetic point of view. Furthermore, an element that is too opaque certainly makes it possible to hide the light source when it is off, but not to obtain satisfactory brightness during lighting. In addition, semi-opaque materials are also sometimes considered unsightly and do not provide satisfactory light output.

Another drawback of this type of lighting and/or signaling device is that the light source constitutes a hot spot. The resulting light is generally considered unattractive, aggressive, and unpleasant by a person observing it.

The object of the disclosed embodiments is to provide a light element which is an alternative to the previous solutions, and which makes it possible to obtain uniform illumination over the entire length of the light element.

To this end, the disclosed embodiments relate to a light element for a bodywork component, comprising at least one light source and a light guide, characterized in that the light guide forms a profile of open cross-section. The light element comprises:

a first element made of injection-molded transparent polycarbonate, defining, along substantially the entire length of the profile, a zone that is transparent to the light emitted by the light source;

at least one second element made of injection-molded black polycarbonate, defining, along substantially the entire length of the profile, a zone that is opaque to the light emitted by the light source;

the light source emitting light from inside the profile toward the transparent and opaque zones.

The light element according to some embodiments can further comprise at least one of the following features:

the opening of the profile is intended to be turned toward the bodywork component, and the profile comprises an inner face intended to be turned toward the bodywork component, and an outer face opposite the inner face;

the light source emits light directly into the first element;

the light source is integrated into the first element, at one end of the profile;

the light source comprises a set of light-emitting diodes positioned on a support closing the profile, the diodes being able to diffuse light through the transparent zone;

the first element comprises, on the inner face, ridges capable of reflecting the light emitted by the light source along the first element;

the ridges are arranged at regular intervals to locally diffuse the light, and are closer to each other as they move away from the light source;

the first element constitutes a profile with an open cross-section;

the first element comprises an extra thickness at the median axis of the profile of the element;

the light element comprises two second elements on either side of the extra thickness, covering the inner faces of the profile of the first element;

each second element comprises a means of attachment to the bodywork component.

each attachment element constitutes a clip;

the second elements form side walls of the profile of the light guide.

the light element comprises a thermoformed decorative film capable of letting light through and covering at least part of the outer face;

the thermoformed decorative film has a thickness preferably between 5 and 20 micrometers;

the thermoformed decorative film is covered with a varnish;

the light element constitutes an outline of the radiator grille.

BRIEF DESCRIPTION OF THE FIGURES

The various embodiments will be better understood upon reading the description which follows, given solely by way of example and with reference to the appended drawings in which:

FIG. 1 is a perspective view of a light guide of a light element according to one embodiment;

FIG. 2 illustrates a cross-section of the light guide of FIG. 1;

FIG. 3 illustrates a cross-section of a light element according to a variant of the embodiment of FIGS. 1 and 2, in which the second elements comprise means of attachment to the bodywork component, such as clips;

FIG. 4 illustrates a detail of the succession of layers forming the wall of the light guide of the light element of FIGS. 1, 2 and 3;

FIG. 5 is a perspective view of a light element according to a first embodiment of the invention;

FIG. 6 is a part of a median section of the light element of FIG. 5;

FIG. 7 is a perspective view of a light element according to a second embodiment of the invention;

FIG. 8 illustrates a cross-section of a light element according to a third embodiment of the invention.

DETAILED DESCRIPTION

The invention relates to a light element 10 for a bodywork component 100, comprising at least one light source 20 and a light guide 30.

Reference is now made to FIG. 1, which illustrates an example of a light guide 30 of a light element 10.

The light guide 30 constitutes a profile with an open cross-section. According to the example of FIG. 1, the profile forms a gutter.

The opening of the gutter is intended to be turned toward the bodywork component 100, and the profile comprises an inner face 32 intended to be turned toward the bodywork component 100, and an outer face 34 opposite the inner face.

Reference is made now to FIG. 2, which illustrates a cross-section of the light guide 30 of FIG. 1.

The light guide 30 comprises a first element 40 made of injection-molded transparent polycarbonate. According to this first embodiment, the first element 40 constitutes a profile with an open cross-section. As shown in FIG. 1, the first element 40 defines, along substantially the entire length of the profile, a zone ZT that is transparent to the light emitted by the light source 20.

The light guide 30 comprises at least one second element 50 made of injection-molded black polycarbonate. According to the example of FIGS. 1 and 2, the light guide comprises two second elements, positioned on the side walls of the gutter formed by the first element 40. Thus, the second elements are inside the profile, on the first element 40, and therefore do not constitute the outer face of the light guide 30. As illustrated in FIG. 1, each second element 40 defines, along substantially the entire length of the profile, a zone ZO that is opaque to the light emitted by the light source 20.

According to an alternative embodiment, the first element 40 has an extra thickness 42 at the zone ZT. According to the example of FIGS. 1 and 2, the extra thickness is located at the median axis of the profile of the first element 40. The light element 10 comprises two second elements 50 on either side of the extra thickness 42. The second elements 40 cover the inner faces of the profile of the first element 40.

According to a variant embodiment, the second elements 50 carry means 80 for attachment to the bodywork component 100. According to the example of FIG. 3, these attachment means are clips positioned at one end of each second element 50, and extending outside the gutter, beyond the inner faces of the first element 40. Thus, the attachment of the light element 10 to the bodywork component 100 is not visible from the outside, because only the first element 40 is flush with the bodywork component and visible from the outside.

According to a variant embodiment, the light element 10 comprises a thermoformed decorative film 60 capable of letting the light pass and covering at least part of the outer face 34. The thermoformed decorative film 60 has a thickness preferably between 5 and 20 micrometers. It is advantageously covered with a varnish 70. The decorative film can, for example, be a chrome-colored film.

FIGS. 1 to 4 illustrate a variant embodiment according to which the thermoformed decorative film 60 covers a part (the side walls of the gutter) of the first element 40. They are therefore not in contact with the second elements 50. In particular, FIG. 4 illustrates a detail of the succession of layers forming a side wall of the light guide of the light element of FIGS. 1, 2 and 3.

The light source 20 emits light from inside the gutter toward the transparent ZT and opaque ZO zones. Indeed, the light source is positioned in the gutter, and the light therefore radiates on the bottom of the gutter and on the inner walls of the latter (side walls, and bottom of the gutter).

Reference is now made to FIG. 5, which illustrates a light element 10 according to a first embodiment of the invention.

According to this embodiment, the first element 40 has an extra thickness 42 at the zone ZT. According to the example of FIGS. 1 and 2, the extra thickness is located at the median axis of the profile of the first element 40. The light element 10 comprises two second elements 50 on either side of the extra thickness 42. The second elements 40 cover the inner faces of the profile of the first element 40.

As illustrated in FIGS. 5 and 6, at one end of the light guide, the extra thickness 42 comprises a housing 44 carrying the light source 20. The housing 44 has an orientation making it possible to emit light in the thickness of the first element 40, at the zone ZT. Thus, the light source 20 is integrated into the first element 40, at one end of the profile; it emits light directly into the first element 40.

In order for this light to be diffused uniformly throughout the zone ZT, the inner face 32, forming the bottom of the gutter and formed by the first element 40, comprises ridges 46 which are capable of reflecting the light emitted by the light source 20 along the first element 40, in the zone ZT.

The ridges 46 are arranged at regular intervals to locally diffuse the light, and are brought closer to each other as they move away from the light source 20.

FIG. 6 provides a detailed illustration of the presence of the housing 44 and of the ridges 46 for diffusing the light.

Reference is now made to FIG. 7, which illustrates a light element 10 according to a second embodiment of the invention.

This second embodiment differs from the first in that the second elements 50 form the side walls of the gutter. Thus, the first element 40 no longer constitutes a profile with an open cross-section. The first element 40 is reduced to the transparent zone ZT. The second elements 50 are thus positioned on either side of the first element 40.

Reference is now made to FIG. 8, which illustrates a light element 10 according to a third embodiment of the invention, in which the light source 20 comprises a set of light-emitting diodes positioned on a support 90 closing the profile, the diodes being capable of diffusing light through the transparent zone ZT. The light thus emitted by the diodes is blocked by the second elements 50, at the opaque zones 50 forming the side walls of the profile.

Such light elements can constitute esthetic components, arranged for example on the front face, or on the doors of a vehicle in order to produce a light signature. For example, the light element 10 can constitute an outline of a radiator grille.

LIST OF REFERENCES

10: light element for bodywork component 100
20: light source of the light element 10

30: light guide of the light element 10
32: inner face of the light guide profile 30
34: outer face of the light guide profile 30
40: first element of the light guide 30, made of injection-molded transparent polycarbonate
42: extra thickness of the first element 40 at the median axis of the profile of the element 10
44: housing integrated into the first element 40 carrying the light source 20
46: ridges of the inner face of the first element 40, at the transparent zone ZT
ZT: zone of the light guide 30 that is transparent to the light emitted by the light source 20
50: second element of the light guide 30, made of injection-molded black polycarbonate
ZO: zone of the light guide 30 that is opaque to the light emitted by the light source 20
60: thermoformed decorative film
70: varnish
80: element for attaching the light element 10 to the bodywork component 100
90: light-emitting diode support
100: motor vehicle

What is claimed is:

1. Light element for a bodywork component, comprising at least one light source and a light guide, characterized in that the light guide forms a profile of open cross-section, and in that it comprises:
   a first element made of injection-molded transparent polycarbonate, defining, along substantially the entire length of the profile, a zone (ZT) that is transparent to the light emitted by the light source;
   at least one second element made of injection-molded black polycarbonate, defining, along substantially the entire length of the profile, a zone (ZO) that is opaque to the light emitted by the light source;
   the light source emitting light from inside the profile toward the transparent (ZT) and opaque (ZO) zones, and wherein the light source is integrated into the first element, at one end of the profile.

2. Light element according to claim 1, wherein an opening of the profile is intended to be turned toward the bodywork component, and the profile comprises an inner face intended to be turned toward the bodywork component, and an outer face opposite the inner face.

3. Light element according to claim 1, wherein the light source emits light directly into the first element.

4. Light element according to claim 1, wherein the light source comprises a set of light-emitting diodes positioned on a support closing the profile, the diodes being capable of diffusing light through the transparent zone (ZT).

5. Light element according to claim 1, wherein the first element comprises, on the inner face, ridges capable of reflecting the light emitted by the light source along the first element.

6. Light element according to claim 5, wherein the ridges are arranged at regular intervals to locally diffuse the light, and are brought closer to each other as they move away from the light source.

7. Light element according to claim 1, in which the first element constitutes a profile with an open cross-section.

8. Light element according to claim 7, wherein the first element comprises an extra thickness (42) at the median axis of the profile of the element.

9. Light element according to claim 8, comprising two second elements on either side of the extra thickness (42), covering the inner faces of the profile of the first element.

10. Light element according to claim 9, wherein each second element (50) comprises a means for attachment to the bodywork component (100).

11. Light element according to claim 10, wherein each attachment element constitutes a clip.

12. Light element according to claim 9, wherein the second elements form side walls of the profile of the light guide (30).

13. Light element according to claim 1, comprising a thermoformed decorative film capable of allowing light to pass and covering at least part of the outer face.

14. Light element according to claim 13, wherein the thermoformed decorative film has a thickness preferably between 5 and 20 micrometers.

15. Light element according to claim 13, wherein the thermoformed decorative film is covered with a varnish.

16. Light element according to claim 1, constituting an outline of a radiator grille.

* * * * *